United States Patent Office 2,845,419
Patented July 29, 1958

---

2,845,419
OXADIAZOLE COMPOUNDS

Adolf Emil Siegrist, Basel, and Franz Ackermann, Binningen, Switzerland, assignors to Ciba Limited, Basel, Switzerland, a Swiss firm No Drawing. Application February 6, 1956
Serial No. 563,445

Claims priority, application Switzerland
February 15, 1955

10 Claims. (Cl. 260—240)

This invention relates to new, fluorescent, practically uncolored oxadiazole compounds which, as illustrated by the compound of the formula:

(1)
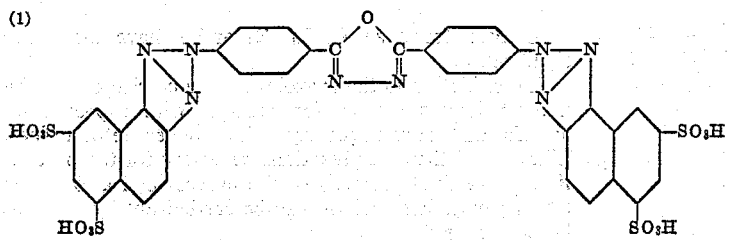

are free from hydroxyl groups and contain at least one aryl residue which is attached on one side to an oxadiazole ring and in p-position thereto to a 1:2:3-triazole ring, the two carbon atoms of which are at the same time ring members of a further aryl radical.

The new compounds contain thus at least once the atom grouping (2)
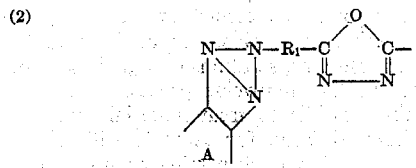

in which A is an aryl radical condensed in the manner indicated by the valence bonds with the triazole ring and $R_1$ indicates an aryl radical attached in p-position to the two hetero rings.

These new compounds are obtained when an aryl carboxylic acid, which contains in p-position to the carboxyl group a diazotisable amino group or a nitrogen-containing substituent convertible into such a group, is subjected on the one hand, if necessary after conversion of the said substituent into a primary amino group, to diazotization of the amino group followed by coupling of the diazo compound formed with an aminoaryl compound free from hydroxyl groups and capable of coupling in the adjacent position to the amino group and by oxidation of the o-aminoazo grouping thereby produced to the triazole ring and, on the other hand, to condensation with a hydrazine on the carboxyl group followed by oxadiazole ring closure by means of an agent which splits out water. It is clear that the individual reactions required for the production of the new compounds can be carried out in varying sequences.

Thus, for example, a p-aminoaryl carboxylic acid can be diazotized, the diazo compound coupled with an aminoaryl compound which couples in the adjacent position to the amino group, the o-aminoazo grouping oxidized to the triazole ring and in this way a compound produced of the formula (3)
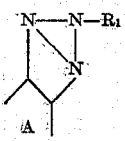

in which A indicates an aryl radical free from hydroxyl groups and condensed with the triazole ring in the manner indicated by the valence bonds, and $R_1$ is an aryl radical which contains in p-position to the bond by which it is attached to the triazole ring, a carboxylic acid group which may if desired be functionally converted. From such a compound, by condensation with hydrazine and by treatment with agents which split out water, the desired oxadiazole compounds are obtained.

As p-aminoaryl carboxylic acids there are advantageously used p-aminobenzoic acids, for example p-aminobenzoic acid which is not further substituted. As azo components there can be used aminoaryl compounds of the benzene series such as 1:3-diaminobenzene, 1-amino-3-methoxy-4-methyl-benzene, 1-amino-3:4 - dimethoxy benzene or preferably of the naphthalene series, which couple in adjacent position to the amino group, e. g. 2-amino-naphthalene being suitable and the amino-naphthalene sufonic acids being especially suitable which contain from 1–3, preferably two sulfonic acid groups. 2-amino-napthalenes which couple in 1-position or 1-aminonaphthalenes which couple in 2-position are concerned. As examples may be mentioned:

1-aminonaphthalene-4- or -5-sulfonic acid,
2-aminonaphthalene-5-, -6- or -7- sulfonic acid,
2-aminonaphthalene-3:5-di-sulfonic acid,
2-aminonaphthalene-5:7-di-sulfonic acid,
1-aminonaphthalene-3:8-di-sulfonic acid,
1-aminonaphthalene-4:8-di-sulfonic acid.

The intermediate products of the formula 3 can now, in the form of the free acids or as their functional derivatives, especially as acid halides, be condensed with hydrazines. In the first mentioned case sulfur trioxide is suitable as condensing agent, especially when dissolved in anhydrous sulfuric acid (oleum), since it not only effects the condensation to the carboxylic acid hydrazide but also the desired ring closure to the oxadiazole in one working operation. Sulfonating agents generally can advantageously be used, that is to say in addition to the oleum already mentioned also, for example, chlorsulfonic acid. When, as in the case of the acid halides, no special condensing agent is necessary, another water-splitting agent can be used for the ring closure, such as thionyl chloride, aluminum trichloride or phosgene. This modification of the process is indicated in those cases in which the sulfonating agent would in addition to the condensation and the ring closure also effect an undesired sulfonation. It should, however, be remarked that even with oleum such a sulfonation does not take place easily either in the radicals $R_1$ or in the radicals A, so long as the radicals A already contain one or even two sulfonic acid groups.

According to the constitution of the hydrazines a variety of end products can be obtained according to the present process. Thus, for example, unsubstituted hydrazine ($H_2N$—$NH_2$), advantageously in the form of hydrazine sulfate can be condensed on both sides with carboxylic acids of the specified constitution and the ring closure carried out. In a similar manner dicarboxylic acid dihydrazides, for example the dihydrazide of oxalic acid ($H_2N$—NH—OC—CO—HN—$NH_2$) or of terephthalic acid (H$_2$N—NH—OC—C$_6$H$_4$—CO—HN—NH$_2$)

can be condensed on both sides with the mentioned carboxylic acids and in these cases a double ring closure carried out. Finally dicarboxylic acid dihydrazides which are aroylated on one side, or preferably monoaroyl hydrazines such as benzoylhydrazine (H$_2$N—NH—OC—C$_6$H$_5$)

can be reacted on one side a carboxylic acid of the specified constitution and again ring closure carried out. By these methods oxadizole compounds are obtained of the formula:

(4)

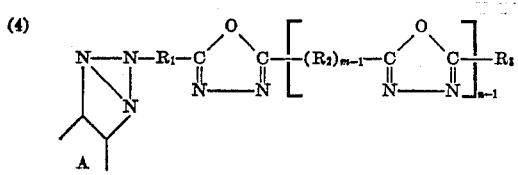

in which A indicates an aryl radical condensed with the triazole ring in the manner indicated by the valence bonds, $R_1$ is an aryl radical attached in p-position to the hetero rings, $R_2$ is any suitable radical, preferably a benzene radical attached in p-position to the oxadiazole rings, $R_3$ is an aryl radical or likewise a radical of the consitution (5)

and m and n each indicates a whole number which is at the most 2.

According to another modification of the present process the procedure is as follows:

A p-aminoaryl carboxylic acid or an aryl carboxylic acid which contains in p-position to the carboxylic acid group a substituent convertible into an amino group, if desired in the form of the acid halide, is condensed with a hydrazine and ring closure to the oxadiazole is then carried out. After the mentioned substituent, if present, has been converted into the amino group (for example a nitro group reduced), the amino compound is diazotized and the diazo compound coupled with an amino-aryl compound which couples in adjacent position to the amino group.

Finally, in the resulting compound, which contains an azo group attached on both sides to aryl nuclei which are free from hydroxyl groups and of which one contains an amino group in adjacent position to the azo group and the other is attached in p-position to the azo group to an oxadiazole ring, the amino azo grouping is oxidized to the triazole ring.

What has been said in connection with the first mentioned modification, especially as regards the selection of the starting materials, likewise applies here in a corresponding manner. Accordingly, for the oxidation to the triazoles advantageously compounds of the following formulae are used:

(6)

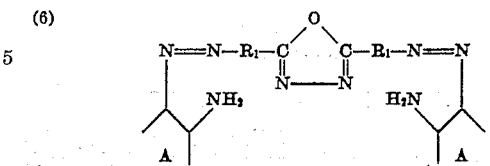

(7)

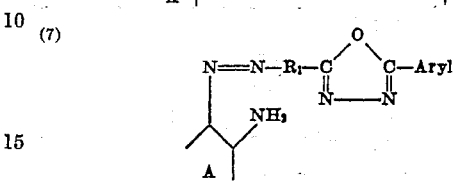

(8)

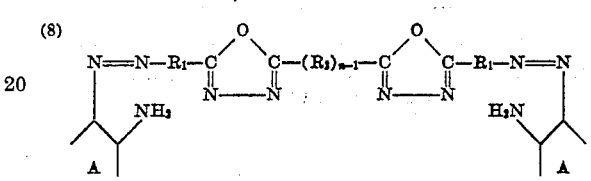

In these formulae A, $R_1$, $R_2$ and n have the above significance.

The oxidation to the triazoles can be carried out in the manner known per se, for example with copper compounds and advantageously with copper tetrammines. Likewise all the other reactions necessary for the production of the final products of the process and also of the starting materials thereof, can be carried out by methods known per se.

The new oxadiazole compounds of the constitution set forth above are suitable for the improvement as regards optical properties, as a rule for the optical brightening, of a variety of materials, especially organic materials and primarily textile materials, with the production of valuable results.

The application of the fluorescent compounds which are used for brightening purposes can take place in such a manner that the material to be improved is saturated with a solution, especially an aqueous solution, or a dispersion of the compound concerned and after hydroextracting or squeezing out, dried. In addition to the mentioned aqueous solutions, solutions in organic solvents can also be used for the improving process of this invention. It is also possible to treat materials with the compounds in dispersed form, for example with dispersions which are obtained with dispersing agents such as soaps, soap-like substances, polyglycol ethers of fatty alcohols, sulfite waste liquor or condensation products with formaldehyde of naphthalene sulfonic acids which may be alkylated.

The compounds suitable as brightening agents can also be brought into use in the course of the process of manufacture of the materials to be improved, for example by including them in a paper pulp or a viscose solution which is to be used for the production of films or threads, or in other spinning masses, for example containing a linear synthetic polyamide or a spinning solution of acetyl cellulose.

The compounds to be used as brightening agents can also be applied as follows:

(a) In admixture with dyestuffs or as addition to dye baths or printing, discharge or reserve pastes. Further also for the after-treatment of dyeings, prints or discharge prints.

(b) In admixture with chemical bleaching agents or as additions to bleaching baths.

(c) In admixture with finishing agents such as starch or synthetic finishes. The compounds to be used according to the invention can for example also be added to the baths used for the production of a crease-proof finish.

(d) In combination with washing agents: The washing agents and brightening agents can be separately added to the washing baths to be used. It is also advantageous to use washing agents which contain brightening agents admixed therewith. As washing agents are suitable for example, soaps, salts of sulfonate washing agents, as for example, of sulfonated benzimidazoles substituted on the 2-carbon atom by higher alkyl radicals, also salts of monocarboxylic acid esters of 4-sulfophthalic acid with higher fatty alcohols or salts of fatty alcohol sulfonates, alkylaryl sulfonic acids or condensation products of higher fatty acids with aliphatic hydroxy or amino-sulfonic acids. Non-ionic washing agents can also be used, for example polyglycol ethers which are derived from ethylene oxide and higher fatty alcohols, alkyl phenols or fatty amines.

The washing agents of the above specified type can also contain the customary washing agent additions, such as alkali metal carbonates, phosphates, pyrophosphates, polyphosphates, metaphosphates, silicates, perborates or percarbonates, so long as the brightening agents are compatible with such additions. It is also possible to prepare washing agents which consist solely or for the most part of inorganic compounds with cleansing effect and the brightening agents. The production of the mixtures of the washing agents and optical brightening agents takes place in a simple manner by mixing and/or grinding of the components together. In this case it may be of advantage to use one or the other component in the dissolved or molten condition for the purpose of facilitating distribution.

In general a small addition of the optical improving agents to the washing agents suffices. There are concerned, for example, quantities of 0.1 to 5 percent calculated on the washing agent. Also smaller quantities, for example, 0.01 percent or even less can be added. Also mixtures with other known brightening agents can be used. The washing agents are used by the customary washing processes. In this manner materials to be cleansed can be simultaneously washed and brightened.

As materials of which the optical properties can be improved, the following may be mentioned:

(A) Textile materials quite generally which can exist in any form, for example, as fibres, threads, yarns, woven or knitted goods or in the form of felt and all goods manufactured therefrom; such textile materials can consist of: natural materials of animal origin, such as wool and silk, but primarily cellulosic materials, such as cotton, hemp, flax, linen, jute and ramie, also semi-synthetic materials, such as regenerated cellulose, for example, artificial silk, viscose, including staple fibre, further of cellulose esters, such as cellulose butyrate and especially acetyl cellulose, furthermore of synthetic materials or those which are obtainable by polycondensation, for example polyamides such as nylon or "Perlon." The brightening effect obtained on these materials has a good fastness to chlorine.

(B) Fibrous materials of other types which are not textile materials and which can be of animal origin, such as feathers, hair, hides and skins and leather obtained from the latter by natural or chemical tanning processes and also goods manufactured therefrom; furthermore materials of vegetable origin such as straw, wood, wood pulp or fibrous materials consisting of compressed fibres, such as paper, papier mâché or compressed wood and also goods manufactured therefrom.

(C) Plastic materials generally which can be present in any form, for example as powder, film, lacquer, resin or moulded objects, also natural or synthetic colloids, such as gelatine or starch, natural or synthetic rubber, synthetically produced glasses or also photographic emulsions and also films or papers produced from the latter, other substances of natural or artificial, organic origin, such as oils, fats or carbohydrates intended as food-stuffs, for example flour, sugar, etc., or finally cosmetic preparations.

When the new oxadiazole compounds are used in combination with other improving agents, for example by any of the methods set forth under (a) to (d) above, this combined treatment is advantageously carried out with the aid of suitable preparations. These stable preparations contain compounds of the constitution set forth above, for example such of the Formula 4, and also further textile treating agents, for example dyestuffs, chemical bleaching agents, finishing agents, or especially washing agents.

The following examples illustrate the invention, the parts being by weight unless otherwise stated and the relation between part by weight and part by volume being the same as that between the kilogram and the litre.

Example 1

Into a solution of 6.5 parts of hydrazine sulfate in 190 parts of oleum (27% $SO_3$), with stirring and cooling, 52 parts of the trisodium salt of 4-[5':7'-disulfonaphtho-1':2':4:5-triazol-(2)]-benzoic acid of the formula

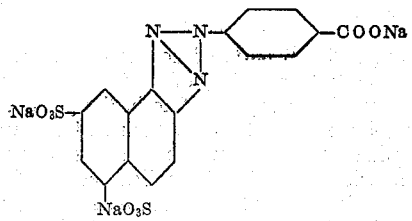

are slowly introduced so that the temperature does not exceed 30° C. The temperature is then brought within 30 minutes to 65° C. and then the whole is stirred for 8 hours to 65–70° C. It is then allowed to cool and the resulting light brown solution poured into ice water and neutralized with 30% sodium hydroxide solution with cooling so that the temperature does not exceed 30° C. Heating is then carried out to 70–80° C. followed by filtration from a small quantity of impurities and the filtrate is salted out with sodium chloride. After cooling, filtration with suction and drying of the residue, the condensation product of the formula:

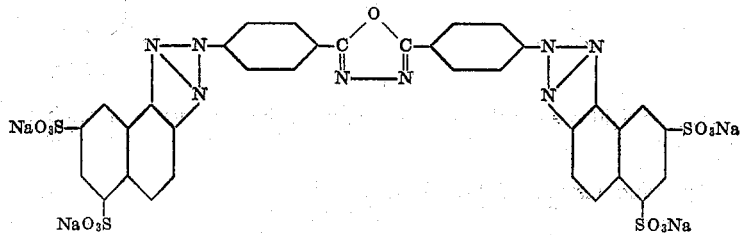

is obtained as a weak yellow colored powder which is soluble in water. When exposed to ultra-violet rays, the aqueous solution has a bluish fluorescence.

By using instead of the above mentioned 4-[5':7'-disulfonaphtho-1':2':4:5-triazolyl-(2)]-benzoic acid equimolecular quantities of 4-[3':6'-disulfonaphtho-1':2':4:5-triazolyl-(2)]-benzoic acid, 4-[5'-sulfonaphtho-1':2':4:5-triazolyl-(2)]-benzoic acid or 4-[6'-sulfonaphtho-1':2':4:5-triazolyl-(2)]-benzoic acid products are obtained with similar properties.

The 4-[5':7'-disulfonaphtho-1':2':4:5-triazolyl-(2)]-benzoic acid used as starting material can be obtained by diazotization of p-aminobenzoic acid, coupling with 2- aminonaphthalene-5:7-disulfonic acid and boiling the resulting dyestuff with ammoniacal copper sulfate solution.

Example 2

25.2 parts of 2:5-bis-[4'-aminophenyl-(1)]-1:3:4-oxadiazole in 250 parts of ice water and 50 parts by volume of concentrated hydrochloric acid, are tetrazotized at 0–2° C. with 50 parts by volume of 4 N-sodium nitrite solution. After 1 hour, the tetrazo solution is stirred for 10 minutes with a little blood charcoal and filtered from a small quantity of impurities. The tetrazo solution is added dropwise within 30 minutes to a neutral solution of 60.6 parts of 2-amino-naphthalene-5:7-disulfonic acid in 250 parts of water at 0–3° C. Thereupon by dropwise addition of sodium acetate solution, the acid reaction to Congo red is caused to disappear and further stirring is continued for 16 hours at 20° C. When the coupling is complete, the resulting dyestuff is completely separated with sodium chloride, filtered off and the filter residue purified by dedissolving in water, salting out and drying the filter residue. The scarlet red dyestuff of the formula

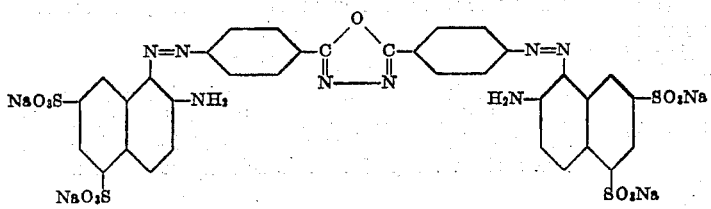

is dissolved in 1,000 parts of hot water and oxidized to the ditriazole compound by boiling for 7 hours with 120 parts of crystalline copper sulfate in the presence of 240 parts by volume of 20% ammonium hydroxide solution. After cooling, the ditriazole compound is separated with sodium chloride, filtered and the filter residue, for further purification, de-coppered in 2,000 parts of hot water by addition of 100 parts by volume of 30% sodium hydroxide solution at 80–85° C. The whole is filtered hot and the ditriazole compound separated from the filtrate by addition of sodium chloride. Stirring is carried out in the cold followed by filtration and drying of the filter residue. The ditriazole compound of the formula

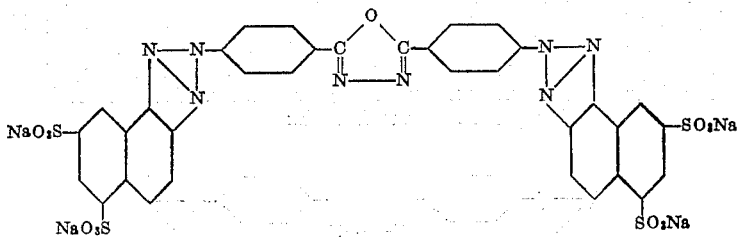

forms a bright, weak yellow colored powder, the aqueous solution of which, when exposed to ultra-violet rays has a bluish fluorescence.

By using instead of the above mentioned 2-aminonaphthalene 5:7-disulfonic acid equimolecular quantities of 2-amino-naphthalene-3:6-disulfonic acid, 2-amino-naphthalene-5-sulfonic acid, 2-aminonaphthalene-6-sulfonic acid or 2-aminonaphthalene-7-sulfonic acid, products with similar properties are obtained.

The above mentioned 2:5-bis-[4'-aminophenyl-(1')]-1:3:4-oxadiazole can be prepared according to French Patent No. 1,080,106, Example 8, paragraph 3 et seq.

Example 3

Into 190 parts of oleum (27% SO₃) are slowly introduced with stirring and cooling so that the temperature does not exceed 30° C., 13.6 parts of benzoic acid monohydrazide and 52 parts of the trisodium salt of 4-[5':7'-disulfonaphtho-1':2':4:5-triazolyl-(2)] benzoid acid. The temperature is then brought within 30 minutes to 65° C. and stirring then carried out for 12 hours at 65–70° C. The whole is allowed to cool, the brown reaction solution is poured into ice water and neutralized with 30% sodium hydroxide solution with cooling so that the temperature does not exceed 30° C. Then heating is carried out to 70–80° C. and the condensation product of the formula:

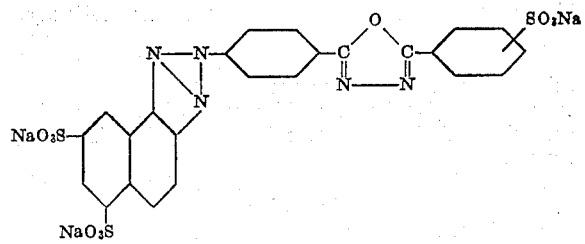

separated with sodium chloride. After cooling, filtration with suction and drying of the filter residue, a bright powder is obtained of which the aqueous solution, when exposed to ultra-violet rays, has a bluish fluorescence.

When there are used instead of the above described 4-[5':7'-disulfonaphtho-1':2':4:5-triazolyl-(2)] - benzoic acid equimolecular quantities of 4-[3':6'-disulfonaphtho-1':2':4:5-triazolyl-(2)]-benzoic acid, 4-[5'-sulfonaphtho-1':2':4:5-triazolyl-(2)]-benzoic acid, 4-[6'-sulfonaphtho-1':2':4:5-triazolyl-(2)]-benzoic acid or 4-[7'-sulfonaphtho-1':2':4:5-triazolyl-(2)]-benzoic acid products are obtained with similar properties.

Products with similar properties are likewise obtained when instead of the above mentioned benzoic acid monohydrazide equimolecular quantities are used of p-chlorobenzoic acid monohydrazide, p-methoxybenzoic acid monohydrozide, o-methoxybenzoic acid monohydrazide or cinnamic acid monohydrazide.

Example 4

Into 190 parts of oleum (27% SO₃), with stirring and cooling, 9.7 parts of terephthalic acid dihydrazide and 52 parts of the trisodium salt of 4-[5':7'-disulfonaphtho-1':2':4:5-triazolyl-(2)]-benzoic acid are introduced slowly so that the temperature does not exceed 30° C. The temperature is then brought within 30 minutes to 65° C. and stirring then continued for 12 hours at 65–70° C. The whole is allowed to cool and the light brown reaction solution poured into ice water and neutralized with 3% sodium hydroxide solution with cooling so that the temperature does not exceed 30° C. Heating is then carried out to 70–80° C. followed by filtration from small quantities of impurities and the filtrate is precipitated with sodium chloride. After cooling, filtration with suction and drying of the filter residue, the condensation product of the formula

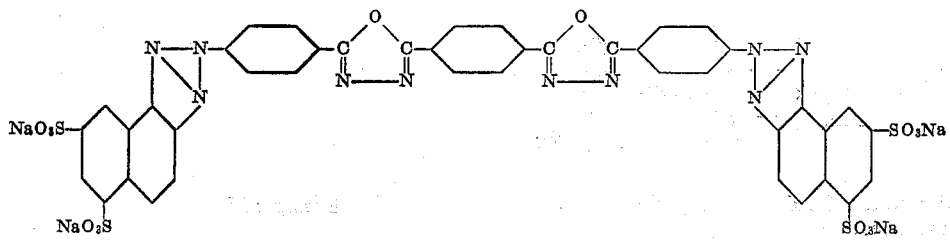

is obtained as a bright powder of which the aqueous solution when exposed to ultra-violet rays, has a bluish fluorescence.

By using instead of the above mentioned terephthalic acid dihydrazide 5.9 parts of oxalic acid dihydrozide, the condensation product of the formula:

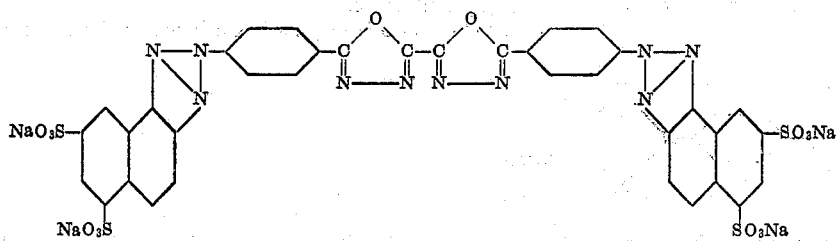

is obtained as a bright, weak yellowish powder of similar properties.

Products with similar properties are likewise obtained when instead of the above mentioned 4-[5':7'-disulfonaphtho-1':2':4:5-triazolyl-(2)]-benzoic acid an equimolecular quantity of 4-[3':6'-disulfonaphtho-1':2':4:5-triazolyl-(2)]-benzoic acid is used.

Example 5

24.7 parts of 2-[4'-chlorophenyl-(1')]-5-[4"-aminophenyl-(1")]-1:3:4-oxadiazole are diazotized in 200 parts of ice water and 30 parts by volume of hydrochloric acid of 30% strength with 25 parts by volume of 4N-sodium nitrite solution at 0–2° C. A solution of 14.3 parts of 2-aminonaphthalene in 75 parts by volume of glacial acetic acid are added to this diazo compound in the course of 60 minutes at 0–2° C. When the coupling is complete, the violet red dyestuff of the formula:

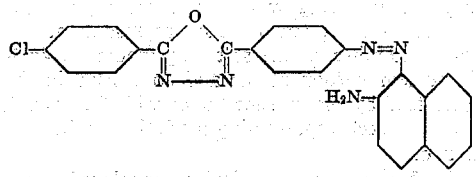

is filtered off, washed with water, freed from impurities by boiling with alcohol and dried.

20 parts of the resulting dyestuff are boiled under reflux for 8 hours in 300 parts by volume of pyridine with 35 parts of copper acetate with stirring. After cooling, the reaction mass is poured into an excess of dilute hydrochloric acid the residue filtered off and washed neutral with water. For further purification the product is boiled with alcohol and dried. The triazole of the formula

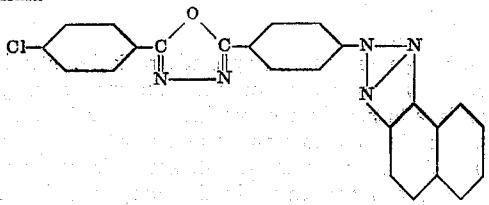

is obtained as a faintly reddish colored powder, of which the solution in trichlorobenzene, when exposed to ultra-violet rays, has a bluish fluorescence.

By using instead of the above mentioned 2-[4'-chlorophenyl-(1')]-5-[4"-aminophenyl-(1")] - 1:3:4 - oxadiazole an equimolecular quantity of 2-[4'-methoxyphenyl-(1')]-5-[-4"-aminophenyl-(1")] - 1:3:4 - oxadiazole, 2-[4'-methylphenyl-(1)]-5-[4"-aminophenyl-(1")] - 1:3:4-oxadiazole or 2-phenyl-5-[4"-aminophenyl-(1")]-1:3:4-oxadiazole, products with similar properties are likewise obtained.

Products with similar properties are also obtained when instead of the above mentioned 2-amino-naphthalene an equimolecular quantity of 1-amino-3-methoxy-4-methyl-benzene or 1-amino-3:4-dimethoxy-benzene is used.

The 2-[4'-chlorophenyl-(1')] - 5 - [4"-aminophenyl-(1")]-1:3:4-oxadiazole mentioned above can be prepared as follows:

Into 192 parts of oleum (27% free SO₃) are slowly introduced with cooling and stirring so that the temperature does not exceed 30° C., 51.2 parts of p-chlorobenzoic acid monohydrazide and 50.1 parts of p-nitrobenzoic acid. The temperature is then brought within 30 minutes to 65° C. and stirring continued for 5 to 6 hours at 75 to 80° C. The whole is allowed to cool, the reaction mixture is poured into 1000 parts of ice water with stirring, the condensation product separating in the form of a white suspension. The mixture is filtered with suction, washed with cold and then with warm water until the reaction is neutral to Congo, and finally the filter residue is stirred in 1000 parts of water at 70 to 80° C., the mixture being rendered distinctly alkaline with sodium carbonate. After filtering with suction, washing with water and drying, there is obtained in good yield 2-[4'-chlorophenyl - (1')] - 5 - [4"-nitrophenyl-(1")]-1:3:4-oxadiazole in the form of a white powder which, after recrystallization from chlorobenzene, melts at 254–259° C.

42 parts of 2-[4'-chlorophenyl-(1')]-5-[4"-nitrophenyl-(1")]-1:3:4-oxadiazole are reduced by being boiled under reflux for 20 hours with stirring in 1500 parts by volume of ethanol and by adding 50 parts of concentrated hydrochloric acid and 110 parts of iron powder. The reaction mixture is rendered alkaline with a solution of sodium hydroxide of 30% strength, filtered hot and the filtrate diluted with the same volume of water, the 2-[4'-chlorophenyl-(1')]-5-[4"-aminophenyl-(1")]-1:3:4-oxadiazole separates off in the form of a white substance. After filtering with suction, washing with water and recrystallization from aqueous ethanol the product melts at 201–203° C.

Example 6

25.2 parts of 2:5-bis-[4'-aminophenyl-(1')]-1:3:4-oxadiazole are tetrazotized as described in Example 2. To this tetrazo solution there is added in the course of one hour a solution of 21.6 parts of 1:3 diaminobenzene in 100 parts by volume of methyl alcohol at 0–2° C. When the coupling is complete, the red dyestuff of the formula

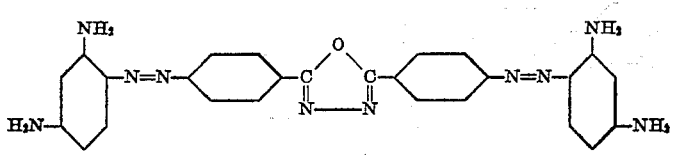

is filtered off, washed with water, freed from impurities by boiling with alcohol and dried.

25.7 parts of the dyestuff obtained are boiled under reflux for 12 hours with stirring in 350 parts by volume of pyridine with 40 parts of copper acetate. After cooling, the reaction mass is poured into an excess of aqueous acetic acid, the residue filtered and washed neutral with water. For further purification the product is boiled with alcohol and then dried. The ditriazole compound of the formula

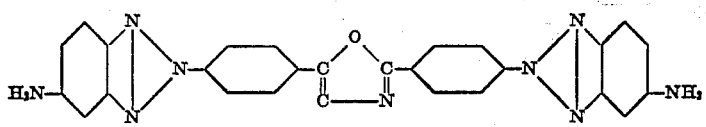

is a red powder, the solution of which in trichlorobenzene, when exposed to ultraviolet rays, has a bluish fluorescence. By melting with an excess of butane sultone at 160–170° C. a water-soluble compound can be prepared.

By using instead of the above mentioned m-phenylenediamine an equimolecular quantity of 1-amino-3-methoxy-4-methyl benzene or 1-amino-3:4-dimethoxy-benzene, products with similar properties are obtained.

Example 7

Undyed cotton yarn is treated in a bath ratio of 1:30 for 30 minutes at 50° C. in a bath which contains per litre 0.05 gram of the compound prepared according to Example 1. After rinsing and drying, the yarn thus treated has a higher white content than the corresponding untreated material.

Example 8

To a sodium hypochlorite bath, containing 2 grams of active chlorine per litre, is added 0.1–0.5 gram per litre of the compound obtained according to Example 2. Cellulosic material treated in this bath appears whiter than material treated without the addition of the specified compound.

Example 9

Undyed textile material of synthetic polyamide fibres, for example nylon or "Perlon," is treated at a bath ratio 1:40 for 1 hour at 85° C. in a bath which contains per litre 0.4 gram of formic acid and 0.2 gram of the compound described in Example 3. After rinsing and drying, the textile material thus treated has a whiter appearance than a corresponding material treated without this compound.

Example 10

The sodium salt of 2-heptadecyl-N-benzyl-benzimidazyl-disulfonic acid is mixed with 0.1–0.5% of the compound described in Example 4. Undyed cotton which has been washed in the customary manner with the resulting mixture has a brighter appearance than cotton which has been washed with the said sodium salt of 2-heptadecyl-N-benzyl-benzimidazyl-disulfonic acid alone.

Example 11

To a paper pulp, containing 100 parts of bleached sulfite cellulose, in a hollander there are first added 2 parts of rosin-size and after 15 minutes 0.5 part of the compound obtainable according to Example 1. After a further 15 minutes 3 parts of aluminium sulfate are added. The paper pulp thus treated is passed through a mixer to the paper machine.

Paper made in this manner has a higher white content than a paper made without the addition of the specified compound in Example 1.

We claim:

1. A fluorescent, practically uncolored compound which is free from hydroxyl groups and corresponds to the formula

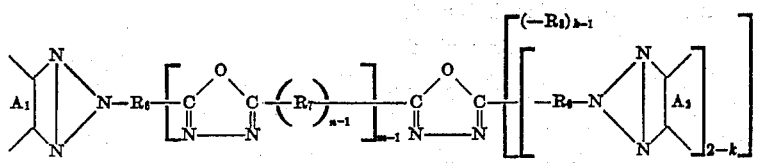

in which $R_6$ and $R_7$ each represents an aromatic radical containing a single ring which is a carbocyclic six-membered ring and which is attached in para-position to the heterocyclic rings, $R_8$ represents an aromatic radical containing a single ring which is a carbocyclic six-membered ring, and $A_1$ and $A_2$ each represents an aromatic radical containing, as the sole ring members, $4n+2$ aromatic nuclear carbon atoms and condensed in the manner indicated by the valence bonds with the triazole ring, $k$, $m$ and $n$ each representing a whole number of at the most two.

2. A fluorescent, practically uncolored compound which is free from hydroxyl groups and corresponds to the formula

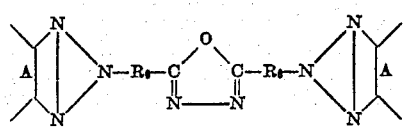

in which $R_6$ represents an aromatic radical containing a single ring which is a carbocyclic six-membered ring and which is attached in para-position to the heterocyclic rings, and A represents an aromatic radical containing as the sole ring members $4n+2$ aromatic nuclear carbon atoms and condensed in the manner indicated by the valence bonds with the triazole ring, $n$ representing a whole number of at the most 2.

3. A fluorescent, practically uncolored compound which is free from hydroxyl groups and corresponds to the formula

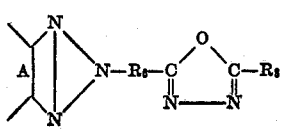

in which $R_6$ and $R_8$ each represents an aromatic radical containing a single ring which is a carbocyclic six-membered ring, $R_6$ being attached in para-position to the heterocyclic rings, and A represents a naphthalene radical condensed in the manner indicated by the valence bonds with the triazole ring.

4. A fluorescent, practically uncolored compound which is free from hydroxyl groups and in its free acid state corresponds to the formula

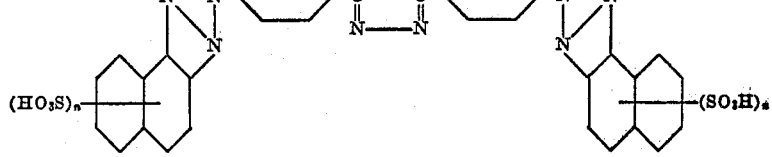

in which $n$ represents a whole number of at the most 2.

5. A fluorescent, practically uncolored compound which is free from hydroxyl groups and in its free acid state corresponds to the formula

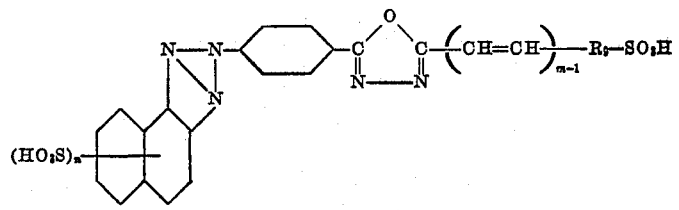

in which $R_9$ represents a monocyclic benzene radical and $m$ and $n$ each represents a whole number of at the most 2.

6. A fluorescent, practically uncolored compound which in its free acid state corresponds to the formula

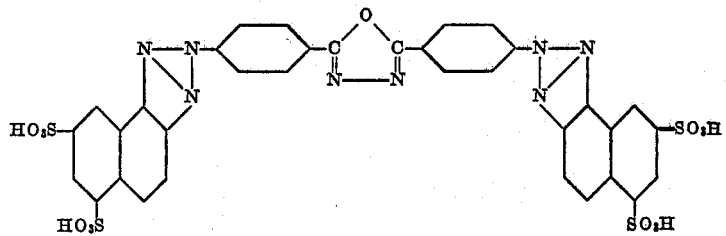

7. A fluorescent, practically uncolored compound which in its free acid state corresponds to the formula

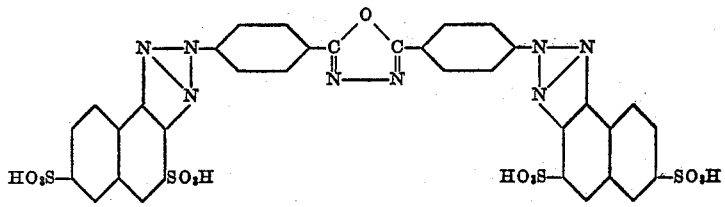

8. A fluorescent, practically uncolored compound which in its free acid state corresponds to the formula

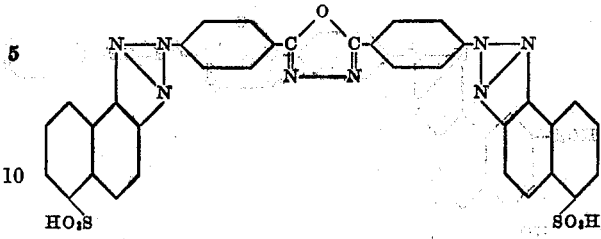

9. A fluorescent, practically uncolored compound which in its free acid state corresponds to the formula

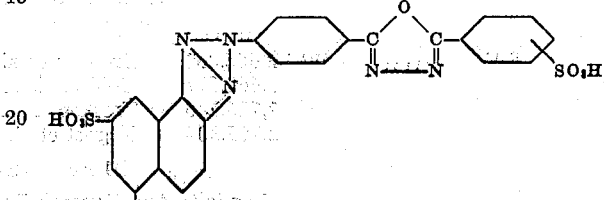

10. A fluorescent, practically uncolored compound which in its free acid state corresponds to the formula
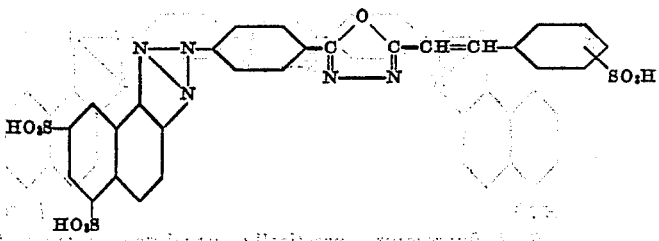
References Cited in the file of this patent
UNITED STATES PATENTS
| | | |
|---|---|---|
| 2,666,062 | Brunner et al. | Jan. 12, 1954 |
| 2,668,777 | Gold et al. | Feb. 9, 1954 |
| 2,726,246 | Trosken | Dec. 6, 1955 |
| 2,765,304 | Siegrist et al. | Oct. 2, 1956 |
OTHER REFERENCES
Landolt: Am. Dyestuff Reporter, April 18, 1949, page 353.
Ser. No. 381,856, Wendt, (A. P. C.).